United States Patent
Perreau-Saussine et al.

(10) Patent No.: US 7,293,940 B1
(45) Date of Patent: Nov. 13, 2007

(54) GUIDE TUBE FOR A FLEXIBLE PIPE FOR TRANSPORTING HYDROCARBONS

(75) Inventors: Dominique Perreau-Saussine, Rio de Janeiro (BR); Gaspar Xavier, Rio de Janeiro (BR)

(73) Assignee: Technip France (FR)

(*) Notice: Subject to any disclaimer, the term of this patent is extended or adjusted under 35 U.S.C. 154(b) by 22 days.

(21) Appl. No.: 10/576,226

(22) PCT Filed: Oct. 15, 2004

(86) PCT No.: PCT/FR2004/002639
§ 371 (c)(1),
(2), (4) Date: May 12, 2006

(87) PCT Pub. No.: WO2005/038326
PCT Pub. Date: Apr. 28, 2005

(30) Foreign Application Priority Data
Oct. 17, 2003 (FR) .................................. 03 12163

(51) Int. Cl.
*F16L 1/26* (2006.01)
(52) U.S. Cl. .............................. 405/224.2; 405/224.3; 405/195.1; 405/168.1
(58) Field of Classification Search .. 405/223.1–224.4, 405/195.1, 168.1
See application file for complete search history.

(56) References Cited

U.S. PATENT DOCUMENTS

| | | | | |
|---|---|---|---|---|
| 3,434,296 A | * | 3/1969 | Geer et al. ................ | 405/168.1 |
| 3,677,016 A | * | 7/1972 | Garrigus ..................... | 405/202 |
| 4,519,726 A | | 5/1985 | Knowles et al. ............ | 405/195 |
| 4,688,966 A | * | 8/1987 | Esparza .................... | 405/195.1 |
| 4,741,647 A | * | 5/1988 | Dumazy et al. ......... | 405/224.4 |
| 5,447,392 A | * | 9/1995 | Marshall .................. | 405/224.4 |
| 5,722,492 A | * | 3/1998 | Finn ......................... | 405/224.2 |
| 5,947,642 A | | 9/1999 | Teixeira et al. .......... | 405/195.1 |
| 6,386,798 B2 | * | 5/2002 | Finn ........................ | 405/224.2 |
| 6,527,053 B2 | * | 3/2003 | Friisk ...................... | 405/224.2 |
| 6,536,527 B2 | * | 3/2003 | Munk et al. ............. | 405/224.2 |
| 2001/0041097 A1 | * | 11/2001 | Finn ........................ | 405/224.2 |
| 2002/0009336 A1 | * | 1/2002 | Munk et al. ............. | 405/224.2 |
| 2002/0079693 A1 | | 6/2002 | Spiering et al. .............. | 285/18 |

FOREIGN PATENT DOCUMENTS

| | | |
|---|---|---|
| DE | 2 151 506 | 4/1973 |
| EP | 0 296 137 | 12/1988 |
| FR | 2 689 603 | 10/1993 |
| GB | 2 375 381 A | 11/2002 |

* cited by examiner

*Primary Examiner*—Frederick L. Lagman
(74) *Attorney, Agent, or Firm*—Ostrolenk, Faber, Gerb & Soffen, LLP

(57) ABSTRACT

A guide tube for a flexible pipe for transporting hydrocarbons comprising an internal tubular element of a substantially rectilinear section extending along an axis (A) and extended by a free section having a curvature along its length and a wall which is internal with respect to the curvature against which the flexible pipe is accommodated when frictionally carried through guides. The rectilinear section comprises eccentric guides for directing the flexible pipe away from the axis (A) and in a direction opposite to the curvature of the free section such that the pipe is deviated from the internal wall.

8 Claims, 3 Drawing Sheets

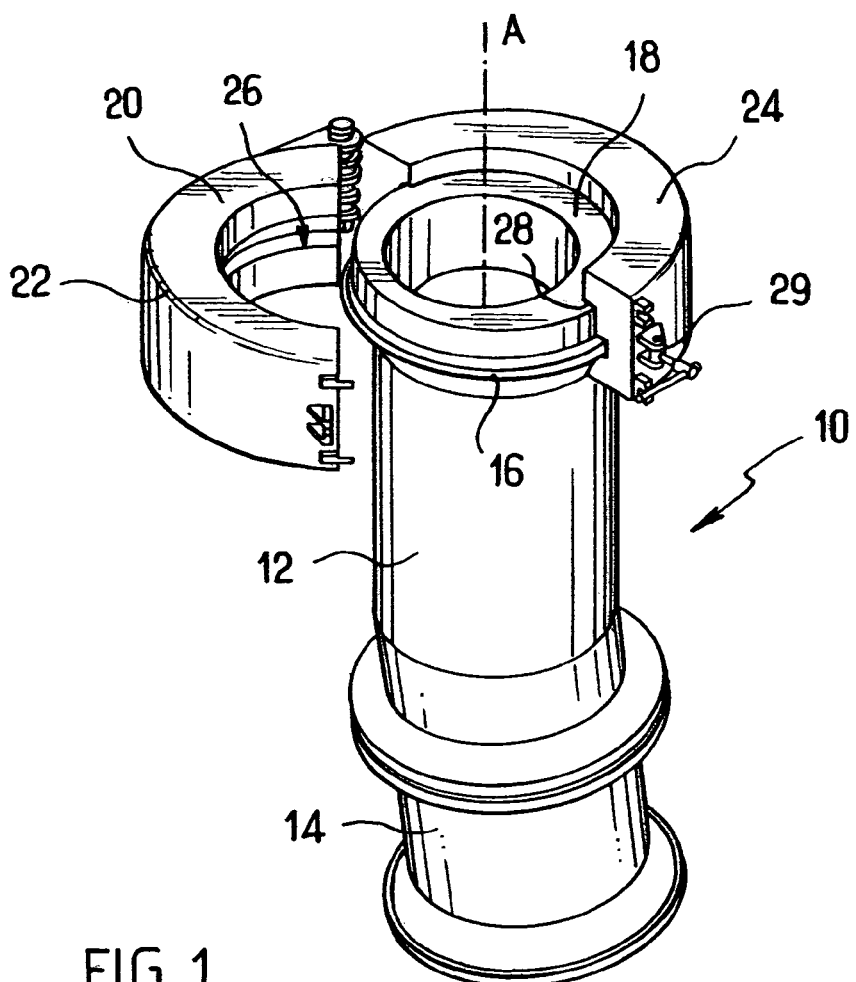
FIG_1
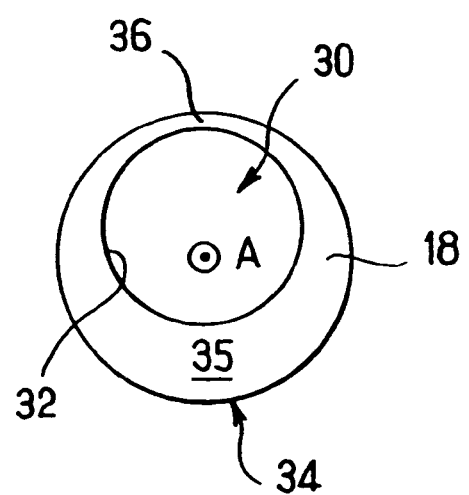
FIG_2

GUIDE TUBE FOR A FLEXIBLE PIPE FOR TRANSPORTING HYDROCARBONS

CROSS REFERENCE TO RELATED APPLICATION

The present application is a 35 U.S.C. §§ 371 national phase conversion of PCT/FR2004/002639, filed 15 Oct. 2004, which claims priority of French Application No. 0312163, filed 17 Oct. 2003. The PCT International Application was published in the French language.

BACKGROUND OF THE INVENTION

The present invention relates to a tube for guiding a flexible pipe for transporting hydrocarbons, more commonly known as a guide tube.

The present invention is designed for offshore oil exploration and, more particularly, for surface offshore installations to which said flexible pipes are designed to be connected. These flexible pipes are of the type described in API (American Petroleum Institute) specifications 17J and 17B.

Known "J" guide tubes mounted vertically on an anchored floating support structure, for example, an oil platform, already make it possible to guide and to protect flexible pipes, one end of which is drawn on board the platform in order to be connected thereto.

Said guide tube comprises a lower tubular element that is generally submerged and has a substantially rectilinear section extending along an axis and extended by a free section having a curvature. This free section has an inner wall internal to the curvature against which said flexible pipe is fitted so as to be entrained in friction when entrained through said guide tube.

Furthermore, with a view to limiting the flexing of the flexible pipe in the vicinity of said free section, which could damage it, a bend limiter is fitted when said pipe is installed. This limiter consists of a bend stiffener made from flexible material, for example polyurethane, mounted fixedly on said free section and forming a sleeve surrounding the pipe in order to restrict its range of movement. A bend limiter of this type is described, in particular, in document FR 2 689 603.

A further embodiment disclosed in that document consists not in connecting the bend limiter directly to said free section, which is rigid, but in connecting it to a tubular member forming a sleeve that is mounted securely around the pipe, projecting and sliding in said free section. In this way, despite the low-level longitudinal movements of the flexible pipe in the guide tube, which gives rise to sliding of the tubular member in the free section, it remains secure and in the extension of said free section. Thus, the tubular member is held clear and the bend limiter extending it fulfills its role, just as in the preceding embodiment.

On the other hand, whereas in the installation method of the preceding embodiment, the flexible pipe was capable of being entrained longitudinally in friction in the bend limiter, in this latter embodiment this does not occur since the bend stiffener is mounted fixedly on the flexible pipe in terms of running length.

Nevertheless, in the two embodiments, the flexible pipe is likely to be entrained in friction against the internal inner wall inside the curvature of said free section, which risks damaging it.

SUMMARY OF THE INVENTION

A problem that arises and that the present invention aims to solve is thus that of proposing a guide tube allowing entrainment of the flexible pipe in said lower tubular element without thereby damaging the flexible pipe.

To that end, the present invention proposes a guide tube for a flexible pipe for transporting hydrocarbons and designed for mounting substantially vertically on an offshore installation to allow connection of said flexible pipe to said offshore installation, said guide tube comprising a lower tubular element having a substantially rectilinear section extending along an axis and extended by a free section having a curvature, said free section having an inner wall internal to the curvature against which said flexible pipe is fitted so as to be entrained in friction when entrained through said guide tube, and said rectilinear section comprising eccentric guide means for guiding said flexible pipe in order to hold it away from said axis in an opposite direction from said curvature so as to keep said pipe away from said internal inner wall.

Thus, a characteristic of the invention lies in the implementation of the eccentric guide means on the rectilinear section of the tubular element, which allow the flexible pipe to be held away from the axis of the rectilinear section when it is entrained in the guide tube. In this way, the pipe is also held away from the internal inner wall inside the free section and can no longer rub against it when it is entrained, which considerably reduces its wear during the procedure of installing and disconnecting the pipe.

According to one embodiment, the eccentric guide means comprise an insert forming a ring, said insert having an inner perimeter that is eccentric relative to the outer perimeter. Thus, the central space of the insert, delimited by the inner perimeter and whose dimensions are smaller than the circumference of the rectilinear section, is offset relative to the axis of this section, toward its wall. Naturally, the central space of the insert is sufficiently large to allow passage of the flexible pipe.

According to a variant embodiment, said eccentric guide means are adapted so as to be held in a bearing relationship against a flange of said substantially rectilinear section. Thus, the eccentric guide means are completely secure in translation of the rectilinear section of the tubular element, along its axis.

According to this variant, and in a particular embodiment, the eccentric guide means are adapted so as to be held in a bearing relationship against said flange by a collar forming a clamp. In this way, the eccentric guide means are easily connected to the rectilinear section and held there firmly.

In order to minimize friction forces on the flexible pipe, said eccentric guide means are made from steel and have a surface with a low friction coefficient.

Furthermore, according to a further embodiment of the invention, the guide tube comprises at least one upper tubular element spaced from said lower tubular element, opposite said free section and arranged coaxially relative to said substantially rectilinear section. Thus, use of a very long tube is avoided, it sufficing to use two tubular elements spaced from one another vertically, as will be explained in greater detail below.

Further special features and advantages of the invention will become more apparent from reading the following description of particular embodiments of the invention that are given by way of indication but not limitation, with reference to the appended drawings.

BRIEF DESCRIPTION OF THE DRAWINGS

FIG. 1 is a diagrammatic perspective view of a tubular element according to one embodiment;

FIG. 2 is a diagrammatic plan view of a detail illustrated in FIG. 1;

DESCRIPTION OF A PREFERRED EMBODIMENT

Figure 4:
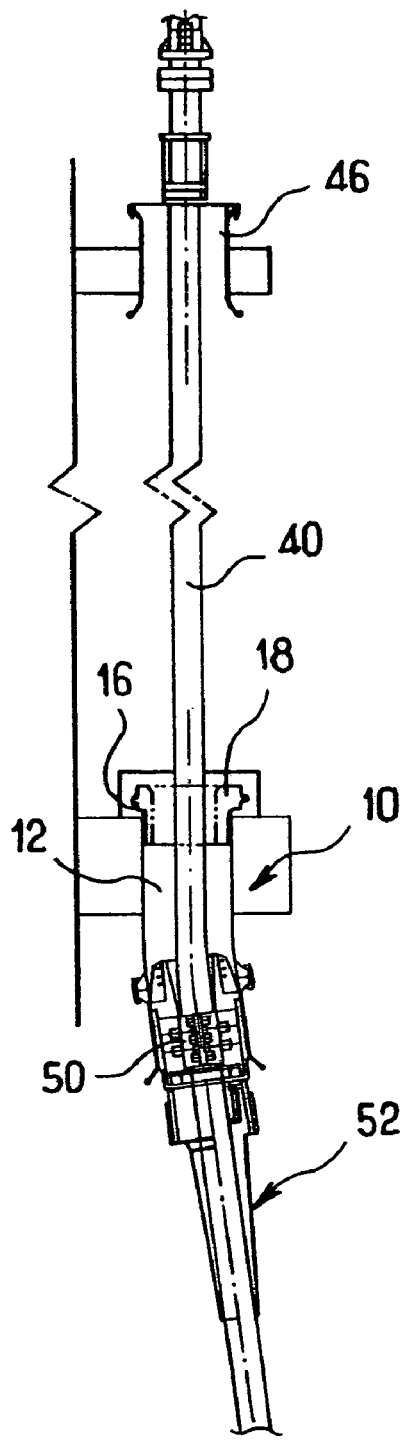
FIG. 4 is a diagrammatic view in vertical section of the invention illustrated in FIG. 1 according to a second use stage.

FIG. 1 illustrates a lower tubular element 10 of a guide tube having a rectilinear section 12 extending along an axis A of symmetry, this rectilinear section 12 being extended by a free section 14 curved with a certain curvature.

Furthermore, this FIG. 1 shows a flared edge 16 surmounting the rectilinear section 12, forming a flange and providing a substantially frustoconical space. This frustoconical space accommodates an eccentric ring 18 that itself has a frustoconical portion for insertion perfectly in said space. The ring is produced, for example from steel coated with an organic material capable of protecting it and of reducing the friction coefficient of its surface.

Thus, the eccentric ring 18 is immobilized in translation and can no longer be further pushed inside the rectilinear section 12.

On the other hand, in order to immobilize it completely in translation relative to the rectilinear section 12, the eccentric ring 18 is held by a removable collar 20 forming a clamp, consisting of two half-parts 22, 24 jointed together.

The half-parts 22, 24 have a U-shaped section defining two shoulders 26, 28 opposite one another, one 26 being adapted so as to bear behind the flared edge 16 and the other 28 being adapted so as to bear against the edge of the eccentric ring 18 in order to immobilize it in the frustoconical space.

Naturally, locking of the eccentric ring 18 is subject to the folding of the two half-parts 22, 24 toward one another and their locking using closure means 29. As will be explained below, locking must be sufficient also to immobilize the eccentric ring 18 in rotation relative to the rectilinear section 12.

FIG. 2 shows the eccentric ring 18 in plan view and also the position of the axis A of the cylindrical section 12 not shown here. Thus, the inner space 30 of the eccentric ring 18 delimited by its inner circumference 32 is eccentric relative to its outer circumference 34, which is itself adapted so as to coincide with the flared edge 16 of the rectilinear section 12 such that it has a thick edge 35 opposite a thin edge 36.

Figure 3:
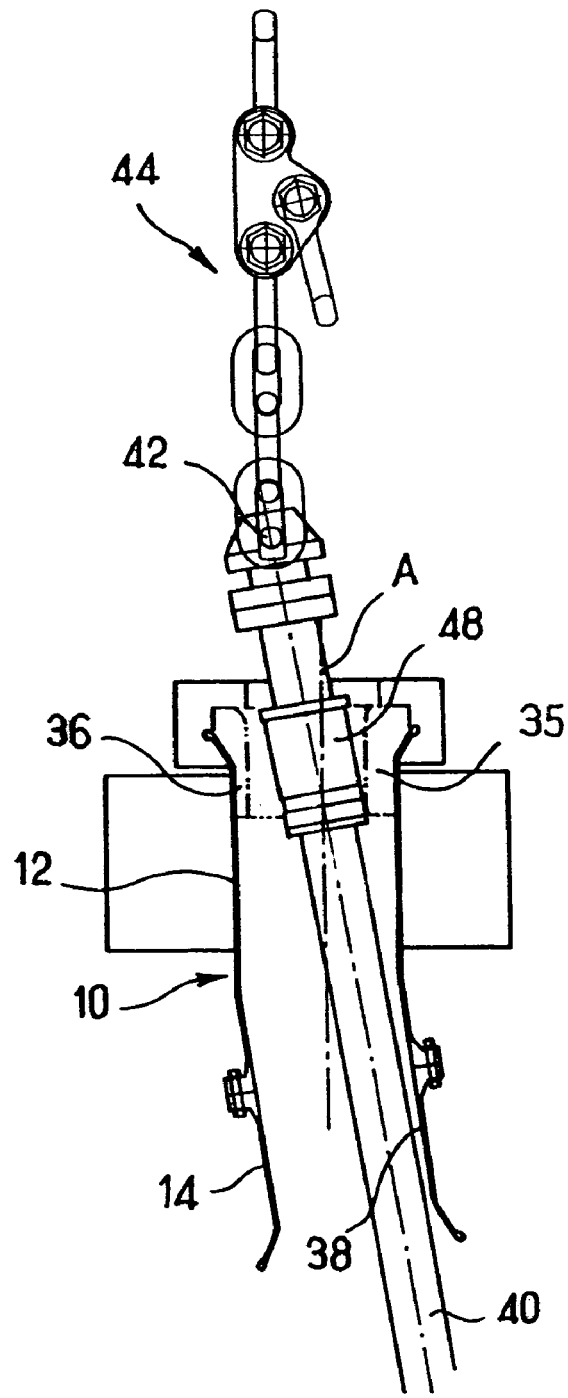
FIG. 3 is a diagrammatic view in vertical section of the invention illustrated in FIG. 1 according to a first use stage.

FIG. 3 shows, in section, the tubular element 10 with its rectilinear section 12 and its curved free section 14. This free section 14 has an inner wall 38 internal to the curvature. It will be noted, and this is one characteristic of the invention, that the thin edge 36 of the eccentric ring 18 is oriented in an opposite direction from the curvature relative to the axis A of symmetry of the rectilinear section and, consequently, the thick edge 35 is oriented toward the curvature. That being the case, it will henceforth be understood why it is necessary for the eccentric ring 18 to be integral in rotation with the rectilinear section 12 since it must retain this position at all costs.

Thus, the thick edge 35 forming a stop offset toward the axis A of symmetry constitutes the eccentric guide means.

This FIG. 3 also shows a flexible pipe 40 whose end 42 is entrained vertically by a line 44 through the tubular element 10 in order to be connected to an upper tubular element 46 illustrated in FIG. 4 and described below.

FIG. 3 shows that the end 42 of the flexible pipe 40 and, more precisely, a connector 48, bears against the thick edge 35 of the eccentric ring 18 and by virtue of this thick edge 35, when it is pulled, the flexible pipe 40 will tend to be moved away from the axis A of symmetry in an opposite direction from the curvature so as to hold the pipe 40 away from the internal inner wall 38. In this way, friction of the flexible pipe 40 against the internal inner wall 38 is at the very least reduced and, at best, prevented, which safeguards the flexible pipe 40 against wear.

FIG. 4 shows the pipe 40 extended in a guide tube comprising the lower tubular element 10 and the upper tubular element 46 held spaced from one another. It also shows the eccentric ring 18 inserted in the flared edge 16 of the rectilinear section 12.

Furthermore, according to this particular embodiment, the flexible pipe is surrounded by a sleeve 50, to which it is secured, embedded in the free section and extended by a bend limiter.

In this embodiment, the curvature of the free section is small such that the flexible pipe 40 is free relative to its internal inner wall and also relative to the eccentric ring 18. On the other hand, with a more curved free section, the flexible pipe would bear against the thick edge of the eccentric ring, which would thus limit the bearing forces of the pipe on the internal inner wall and thus the friction forces. In this way, the flexible pipe would be damaged less by any relative displacements of the pipe and the free section.

According to a further object, the present invention proposes means for radially guiding a flexible pipe inside a tubular element.

Figure 5:
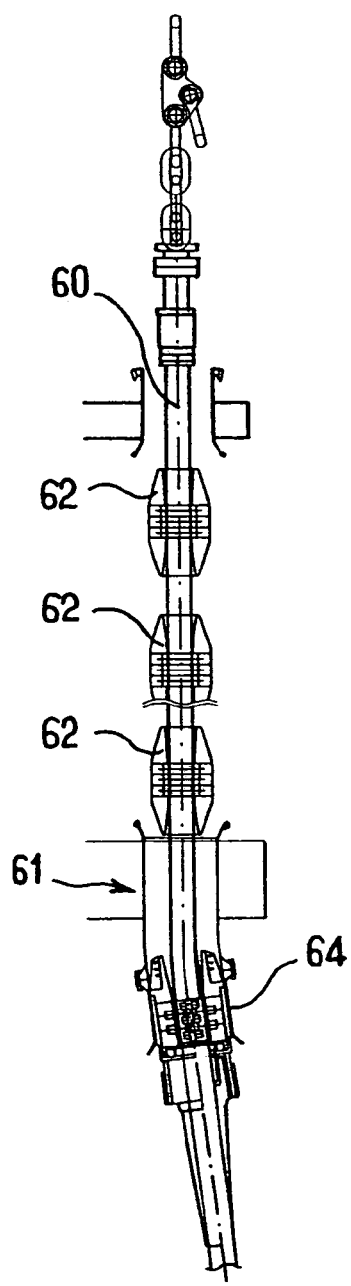
FIGS. 5 and 6 illustrate the invention according to a further object.

FIG. 5 shows a flexible pipe 60 extended entirely in a guide tube in a manner similar to that shown in FIG. 4 and traversing a lower tubular element 61 that has no eccentric ring. On the other hand, in this case, the pipe is provided with biconical sleeves 62 that completely surround the pipe 60 and are held in a fixed position relative to it and spaced from one another.

These biconical sleeves 62, described below, are adapted so as radially to guide the flexible pipe 60, particularly in the tubular element 61 when it is entrained longitudinally for connection.

The biconical sleeves 62 have a radial section corresponding to the inner section of the lower tubular element in order, on the one hand, to slide freely in said tubular element and, on the other hand, to keep the flexible pipe at a distance from the inner wall of the lower tubular element 61 and, in particular, from the internal inner wall of its free section 64. Thus, the flexible pipe is safeguarded against friction and thus against wear.

Figure 6:
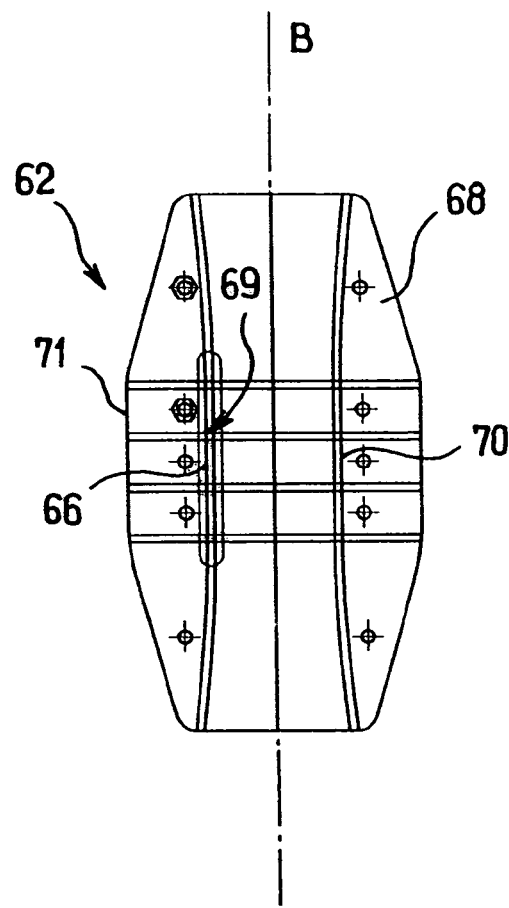

FIG. 6 shows a biconical sleeve comprising a central clamp 66 mounted on a tubular member 68 extending symmetrically on either side of said central collar 66 along an axis B of symmetry. The central collar 66 surrounds a median part 70 of the tubular member 68 that itself has an inner surface 69 in contact with the flexible pipe and an outer surface 71. The tubular member 68 extends from the median part 70 on the one hand, so that the inner surface 69 flares out in order to move away from the axis B of symmetry and, on the other hand, so that its outer surface 71 converges toward the axis B of symmetry.

Thus, by virtue of the flared inner surface 69 the flexible pipe is adapted to be flexed substantially, which enables the mean stiffness of the pipe to be reduced. Furthermore, the outer surface 71 is adapted to make it easier for the biconical sleeves to slide in the tubular elements.

According to a particular embodiment of the invention (not shown), use is made both of biconical sleeves for guiding the flexible pipe in the lower tubular element and eccentric guide means consisting of an eccentric ring. This eccentric ring is mounted on the lower tubular element in a similar manner to the first subject of the invention, but the section of the biconical sleeves is in this case smaller or substantially equivalent to the inner section defined by the eccentric ring and no longer by the inner section of the tubular element, so that it can traverse it freely.

In addition, according to a particular characteristic, the biconical sleeves are spaced along the flexible pipe by a distance shorter than the total length of the lower tubular element so that the flexible pipe is always guided radially by at least one biconical sleeve sliding in the lower tubular element when it is entrained therein.

The invention claimed is:

1. A guide tube for a flexible pipe for transporting hydrocarbons and mountable substantially vertically on an offshore installation to allow connection of said flexible pipe to said offshore installation, said guide tube comprising a lower tubular element having a substantially rectilinear section extending along an axis (A) said lower tubular element being extended by a free section having a curvature along its length, said free section having an inner wall internal to the curvature against which said flexible pipe is fitted so the pipe is entrained in friction when entrained through said guide tube, and said rectilinear section comprising an eccentric guide for guiding said flexible pipe in order to hold said flexible pipe away from said axis (A) in an opposite direction from said curvature of said free section so as to keep said pipe away from said internal inner wall;

said eccentric guide comprises an insert forming a ring, said insert having an inner perimeter that is eccentric relative to an outer perimeter thereof.

2. The guide tube as claimed in claim 1, wherein said substantially rectilinear section has a flange against which said eccentric guide fits in order to hold said guide in a bearing relationship.

3. The guide tube as claimed in claim 2, further comprising a collar operable for holding said eccentric guide in a bearing relationship against said flange, and the collar forming a clamp for clamping said guide.

4. The guide tube as claimed in claim 1, wherein said eccentric guide has a surface with a low friction coefficient in contact with said flexible pipe.

5. The guide tube as claimed in claim 1, further comprising at least one upper tubular element spaced from said lower tubular element, opposite said free section and arranged coaxially relative to said substantially rectilinear section.

6. In combination, a guide tube as claimed in claim 1 with a flexible pipe for transporting hydrocarbons and designed to be entrained in the guide tube, radial guides positioned and operable to guide the pipe through said lower tubular element.

7. The combination as claimed in claim 6, wherein said radial guides comprise biconical sleeves spaced apart along said flexible pipe by a distance shorter than a length of said tubular element.

8. The guide tube of claim 4, wherein said eccentric guide is made of steel.

* * * * *